United States Patent Office 3,297,602
Patented Jan. 10, 1967

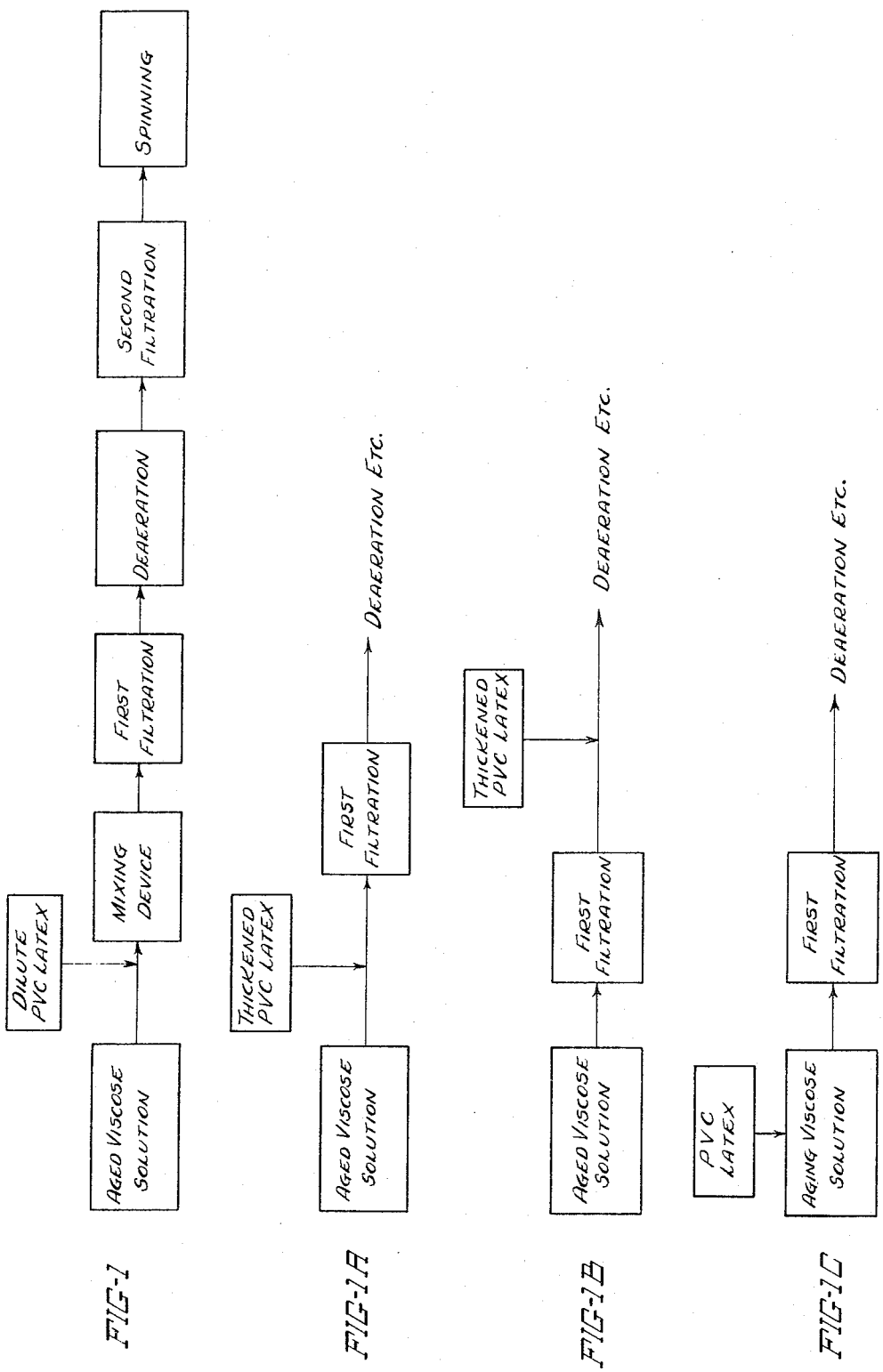

3,297,602
PROCESS OF PREPARING SPINNABLE POLY-
VINYL CHLORIDE LATEX/CELLULOSE
XANTHATE COMPOSITIONS
John G. Davoud, Pottstown, Pa., assignor to The Firestone Tire & Rubber Company, Akron, Ohio, a corporation of Ohio
Filed Mar. 11, 1963, Ser. No. 264,255
5 Claims. (Cl. 260—17)

This invention relates to (1) a viscose (regenerated cellulose) filament which contains 5 to 40 percent or more of polyvinyl chloride (referred to herein as PVC), based on the weight of the viscose, (2) products containing such filaments, and (3) the method of preparing such filaments. The polyvinyl chloride serves as a delustrant.

Various materials have been incorporated in viscose to alter its properties. Certain of these materials react with the viscose. Many of the filaments produced from viscoses to which other materials have been added require an after-treatment, as with formaldehyde.

When PVC is mixed with viscose, no reaction is apparent, and no after-treatment is required. It is possible to incorporate 10 to 20 percent, or as much as 40 percent or more of PVC into viscose. The PVC greatly improves the "handle" and "drape" of the viscose rayon product without deleterious effect on its color. The addition of the PVC cheapens the product because the gravity of the PVC is less than that of rayon. Five percent, or more delusters the filament and yarns, etc. made from it.

Because the viscose has a much greater viscosity than the PVC latex, problems have arisen in providing and using a mixture of the PVC and viscose, and solutions of these problems are a part of the invention. The process will be discussed in connection with the accompanying flow sheets, which are illustrative.

FIGURES 1, 1A, 1B and 1C depict different procedures illustrative of steps in the preparation of a mixture of viscose and PVC for spinning, etc.

The viscose solution is prepared in any usual way as by steeping cellulose sheets in alkali and then shredding them, with subsequent xanthation. A solution of about 6 to 9 percent of the resulting xanthate is dissolved in sodium hydroxide of about 6 to 8 percent strength. This viscose of about 2.5 percent sulfur content is then aged to obtain a ripened-salt index within the range of 3 to 10 percent. Any usual procedures for the preparation of such a ripened viscose solution may be employed.

The viscosity of the viscose solution will depend upon the process of making it and may vary from 30 to 80 poises, about 50 poises being preferred—said viscosity being determined by a falling-ball viscosimeter. The viscose is not generally diluted to any particular viscosity, solutions within the foregoing range being generally satisfactory.

The PVC is used as a water dispersion, the particle size being within the range of about 200 to 20,000 Angstrom units. The method of polymerization is unimportant. The latex is diluted with water to a total solids content of about 15 to 25 percent to get increased stability in the alkaline viscose solution. The following formula for preparation of the PVC dispersion is illustrative:

| | Parts by weight |
|---|---|
| Vinyl chloride | 100 |
| Softened water | 100 |
| Sodium lauryl sulfate | 2.0 |
| Sodium carbonate | 0.20 |
| Potassium persulfate | 0.15 |

The PVC latex may, for example, have the following properties:

| | Range | Preferred |
|---|---|---|
| Relative viscosity | 1.90 to 3.10 | 2.4 |
| pH | 6.5 to 9.5 | 9. |
| Specific gravity | 1.05 to 1.25 | 1.168 |
| Surface tension | 28 to 45 dynes/cm | 35 |

The suggested viscosity is within the "general purpose" range, and might be higher or lower to alter the softening point. The pH and surface tension indicated as preferred are selected to give a product of good stability on storage. The specific gravity is a function of the latex total solids.

Normally the viscosity of the PVC latex as supplied commercially is within the range of 5 to 50 cps. Hence mixing with the much more viscous viscose presents a problem. Several solutions are offered as a part of this invention.

(1) Feed the dilute PVC latex into the viscose stream at the suction side of a high shear pump or other mixing device feeding the viscose solution to the first filtration step. See FIGURE 1.

(2) Add thickener (preferably cellulosic type) to the PVC latex so that its viscosity approaches that of the viscose, and add it before the filtration step. See FIGURE 1A.

(3) Same as second method but add thickened latex after the first filtration step. See FIGURE 1B.

(4) Addition of PVC latex to the xanthate ripening tank. See FIGURE 1C.

*Procedure according to FIGURE 1*

A preferred procedure includes the general steps indicated in FIGURE 1. A solution of about 8 percent cellulose xanthate and about 6 percent sodium hydroxide with a sulfur content of about 2.5 percent is aged to produce a ripened-salt index of 5 to 8 percent, which is the material indicated in the first block of FIGURE 1.

The first filtration of the aged viscose is generally through a 5-micron cotton batting type filter. This removes objectionable gels from the viscose dope and if the PVC is added prior to this filtration the filter removes particles or coagulum which exceeds 5 microns in diameter. There is usually a pressure drop of 40 to 50 pounds per square inch in the filter. The PVC latex can advantageously be added to the aged xanthate at the suction side of the high shear pump used to feed the solution through the filter. Alternatively, the PVC latex can be mixed into the viscose in special mixing equipment provided immediately ahead of the filter.

The PVC latex is preferably diluted with water from a total solids content of from 50 to 55 percent as produced at the plant, to a total solids level of about 15 to 25 percent to increase its stability in the alkaline viscose solution.

The dispersion produced by mixing the PVC and viscose is then deaerated, preferably by pumping through a continuous falling film-type deaerator. This is advantageously operated at 10 to 25 mm. Hg (absolute) pressure. The deaeration may remove as much as 1 to 2 percent of water from the system, and if this is objectionable from a viscosity viewpoint, sufficient water is added in a prior step to compensate for this loss in order to yield a composition of the proper viscosity at the discharge of the deaerator.

After deaeration the dispersion of viscose and PVC is again filtered and metered through gear pumps to conventional spinnerettes where spinning is carried on according to conventional procedures. The pressure of the dispersion in the spinnerettes may be in the 40 to 80 p.s.i. range. The spinnerettes discharge the spun filaments into a conventional sulfuric acid coagulating bath at any suitable temperature as, for example, at 40 to 60° C. The acid concentration is usually roughly 10 percent. Acid is added to the bath continuously or intermittently, as necessary to maintain the proper acid concentration for regeneration of the cellulose, and continuous withdrawal of the filaments is used to prevent excessively high concentrations of the sodium sulfate produced. Preferably the high shear rate at the spinnerette orifices reduces the viscosity of the dispersion of viscose and PVC to about 50 to 70 cps. After leaving the coagulating bath the continuous PVC-delustered filament of regenerated cellulose will normally be drawn off and twisted in essentially the same manner as for standard non-delustered filament, neither the draw-off rate or amount of twist being critical. Many filaments are combined to produce the yarn which has improved hand and drape.

*Process according to FIGURE 1A*

If the PVC latex is thickened it may be added directly to the stream of aged xanthate prior to filtration, even after the xanthate passes through the filter pump. Thickening is achieved in any suitable manner, as by the addition of water-soluble thickeners, well known in the art. The thickeners may be natural (e.g. alginates, agars, gums, gelatins, etc.) or synthetic (polyacrylate, alkylated celluloses, carboxylated celluloses, etc.). The amount of thickener required will depend upon the type and quantity of surface active material in the latex, as well as the viscosity desired in the thickened latex.

By bringing the PVC latex to a viscosity of 100 to 500 cps. it is readily mixed with the viscose as by merely combining a stream of the PVC latex with a stream of the viscose.

*Process according to FIGURE 1B*

The thickened PVC latex may be added to the viscose stream after it leaves the filter. It is usually added before the aeration step because the latex tends to become foamy, and air bubbles are to be avoided.

*Process according to FIGURE 1C*

The PVC latex may be mixed with the viscose solution before or during ripening, the only problem being to obtain adequate admixture of these two materials of quite different viscosities. The presence of the PVC in the latex during ripening has no noticeable effect.

The particle size of the PVC in the latex affects the yarn properties. The optimum particle size is generally in the 0.3 to 1.0 micron range.

The composition of the latex depends upon the process by which it is made, but it is usually produced with a solids content of 50 to 55 percent and contains 3 to 6 percent of an emulsifier.

The processes disclosed are illustrative and the invention is not limited thereto.

What I claim is:

1. The process of preparing a spinnable composition of viscose with polyvinyl chloride particles dispersed therein which process comprises intimately mixing polyvinyl chloride latex with a sodium hydroxide solution of aged cellulose xanthate, filtering the mixture to remove large particles and then deaerating.

2. The process of preparing a spinnable composition of polyvinyl chloride and cellulose xanthate which comprises mixing a thickened polyvinyl chloride latex with aged cellulose xanthate.

3. The process of producing a spinnable composition of polyvinyl chloride and cellulose xanthate which comprises mixing polyvinyl chloride latex with cellulose xanthate prior to completion of the aging thereof and then filtering and deaerating the resulting mixture.

4. The process of producing a spinnable composition of polyvinyl chloride and cellulose xanthate which includes deaerating an aqueous dispersion containing particles of polyvinyl chloride and aged cellulose xanthate.

5. The process of preparing a filament which comprises mixing polyvinyl chloride latex with a sodium hydroxide solution of cellulose xanthate and then spinning the xanthate solution with the latex dispersed therein.

References Cited by the Examiner

UNITED STATES PATENTS 2,784,052    3/1957    Jacobson _____ 260—17.4

OTHER REFERENCES

Ott et al.: "Cellulose Derivatives," Part II, 1954, pp. 960–961, 1954.

WILLIAM H. SHORT, *Primary Examiner.*

J. NORRIS, *Assistant Examiner.*

PO-1050
(5/69)

UNITED STATES PATENT OFFICE
CERTIFICATE OF CORRECTION

Patent No. __3,297,602__      Dated __January 10, 1967__

Inventor(s) __John G. Daveud__

It is certified that error appears in the above-identified patent and that said Letters Patent are hereby corrected as shown below:

Column 1, line 26 after the figure 10, the word "to" should be -- or --

SIGNED AND
SEALED

NOV 4 1969

(SEAL)
Attest:

Edward M. Fletcher, Jr.
Attesting Officer

WILLIAM E. SCHUYLER, JR.
Commissioner of Patents